(12) United States Patent
Nose

(10) Patent No.: US 8,817,005 B2
(45) Date of Patent: Aug. 26, 2014

(54) REFLECTION-TYPE DISPLAY APPARATUS

(75) Inventor: Masaki Nose, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 908 days.

(21) Appl. No.: 12/898,025

(22) Filed: Oct. 5, 2010

(65) Prior Publication Data

US 2011/0122115 A1 May 26, 2011

(30) Foreign Application Priority Data

Nov. 26, 2009 (JP) ................................ 2009-268287

(51) Int. Cl.
*G06F 3/038* (2013.01)
*G09G 5/10* (2006.01)

(52) U.S. Cl.
USPC .......................................... 345/211; 345/690

(58) Field of Classification Search
USPC ......... 345/211, 209, 238, 224, 246, 212, 173, 345/178
See application file for complete search history.

(56) References Cited

U.S. PATENT DOCUMENTS

2006/0124897 A1* 6/2006 Shingai et al. ........... 252/299.01

FOREIGN PATENT DOCUMENTS

JP 2008-33338 A1 2/2008

* cited by examiner

*Primary Examiner* — Michael Faragalla
(74) *Attorney, Agent, or Firm* — Kratz, Quintos & Hanson, LLP

(57) ABSTRACT

A reflection-type display apparatus includes: scan electrodes and signal electrodes that are provided in matrix form; a setting circuit configured to set at least one of scan electrodes as one of a reset line, a writing line and a non select line, the reset line and the writing line being in a selected state, the non select line being in an unselected state; a supply circuit configured to supply image data to at least one of signal electrodes while shifting the reset line, the non select line or the writing line; an extraction circuit configured to extract a writing line corresponding to a pixel which is not changed to a certain display state based on the image data; and a control circuit to set a first scan speed to the extracted writing line, the first scan speed being different from a second scan speed set to an un-extracted writing line.

12 Claims, 14 Drawing Sheets

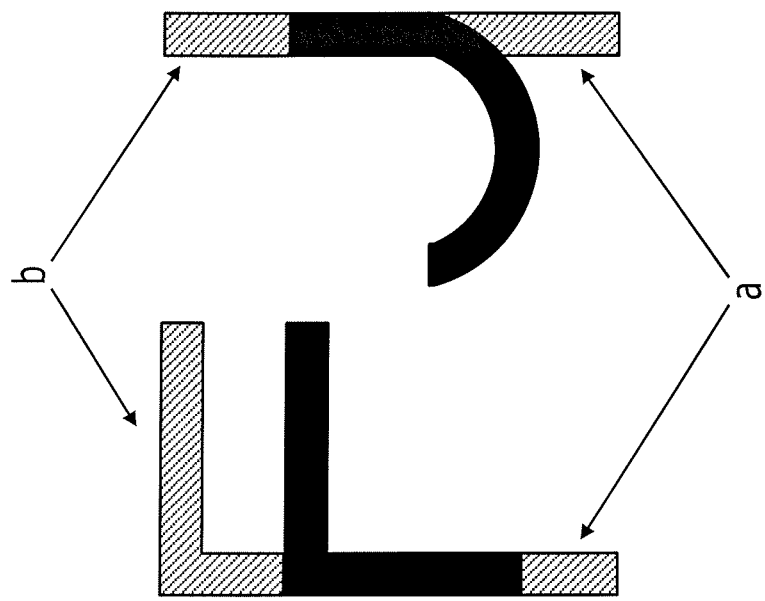
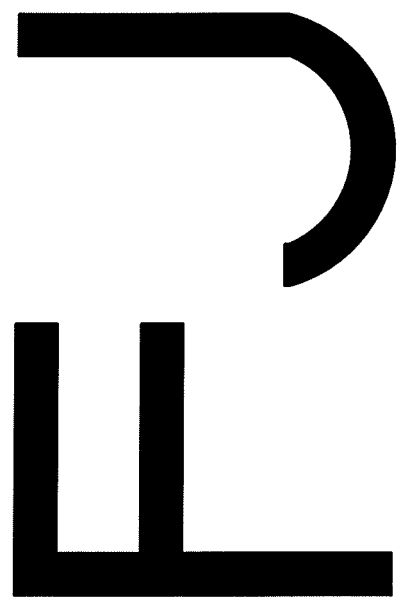
FIG. 2

FIG. 5A  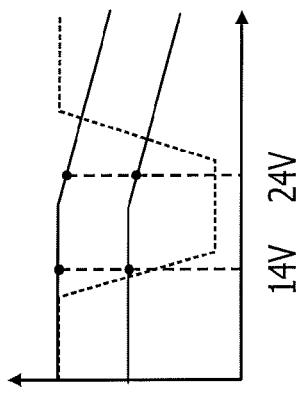
RESPONSE CHARACTERISTICS OF 4ms PULSE
FIG. 5B 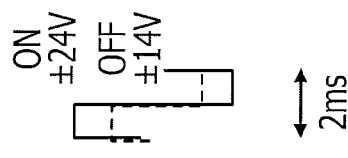 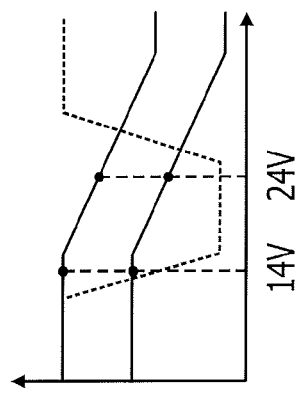
RESPONSE CHARACTERISTICS OF 2ms PULSE
FIG. 5C 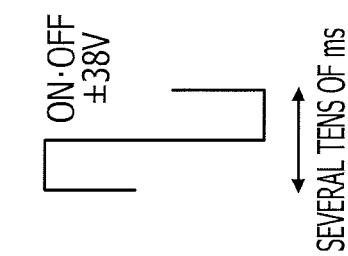 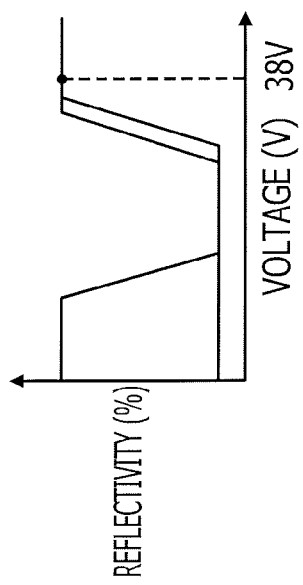
RESPONSE CHARACTERISTICS OF 1ms PULSE

FIG. 6

[DRIVER OUTPUT VOLTAGE]

|  | FIRST HALF | LATTER HALF |
|---|---|---|
| ON-SEG | 38 | 0 |
| OFF-SEG | 26 | 12 |
| ON-COM | 0 | 38 |
| OFF-COM | 32 | 6 |

[VOLTAGE APPLIED TO EACH PIXEL (SEG-COM DIFFERENCE)]

|  | FIRST HALF | LATTER HALF |
|---|---|---|
| SELECTED ON | 38 | -38 |
| SELECTED OFF | 26 | -26 |
| UNSELECTED ON | 6 | -6 |
| UNSELECTED OFF | -6 | 6 |

FIG. 7

[DRIVER OUTPUT VOLTAGE]

|         | FIRST HALF | LATTER HALF |
|---------|------------|-------------|
| ON-SEG  | 24         | 0           |
| OFF-SEG | 14         | 10          |
| ON-COM  | 0          | 24          |
| OFF-COM | 19         | 5           |

[VOLTAGE APPLIED TO EACH PIXEL (SEG-COM DIFFERENCE)]

|               | FIRST HALF | LATTER HALF |
|---------------|------------|-------------|
| SELECTED ON   | 24         | -24         |
| SELECTED OFF  | 14         | -14         |
| UNSELECTED ON | 5          | -5          |
| UNSELECTED OFF| -5         | 5           |

REFLECTION-TYPE DISPLAY APPARATUS

CROSS-REFERENCE TO RELATED APPLICATIONS

This application claims the benefit of priority from Japanese Patent Application No. 2009-268287 filed on Nov. 26, 2009, the entire contents of which are incorporated herein by reference.

BACKGROUND

1. Field

Embodiments discussed herein relate to a reflection-type display apparatus.

2. Description of Related Art

A cholesteric liquid crystal may be used as a method of displaying electronic paper. The cholesteric liquid crystal retains displayed data semipermanently, and is notable for its vivid color display, high contrast, or high resolution.

Related art is disclosed in Japanese Laid-open Patent Publication No. 2008-33338.

SUMMARY

According to one aspect of the embodiments, a reflection-type display apparatus includes: a plurality of scan electrodes and a plurality of signal electrodes that are provided in matrix form; a setting circuit configured to set at least one of the plurality of scan electrodes as one of a reset line, a writing line and a non select line, the reset line and the writing line being in a selected state, the non select line being in an unselected state; a supply circuit configured to supply image data to at least one of the plurality of signal electrodes while shifting the reset line, the non select line or the writing line; an extraction circuit configured to extract a writing line corresponding to a pixel which is not changed to a certain display state based on the image data; and a control circuit configured to set a first scan speed to the extracted writing line, the first scan speed being different from a second scan speed set to an un-extracted writing line.

Additional advantages and novel features of the invention will be set forth in the description that follows, and will become more apparent to those skilled in the art upon examination of the following or upon learning by practice of the invention.

BRIEF DESCRIPTION OF THE DRAWINGS

FIG. 2 illustrates exemplary patterns;

FIGS. 5A, 5B and 5C illustrate exemplary response characteristics of a cholesteric liquid crystal;

FIG. 6 illustrates an exemplary voltage of a driving waveform;

FIG. 7 illustrates an exemplary voltage for displaying mid-tone image data;

DESCRIPTION OF EMBODIMENTS

Figure 1A:
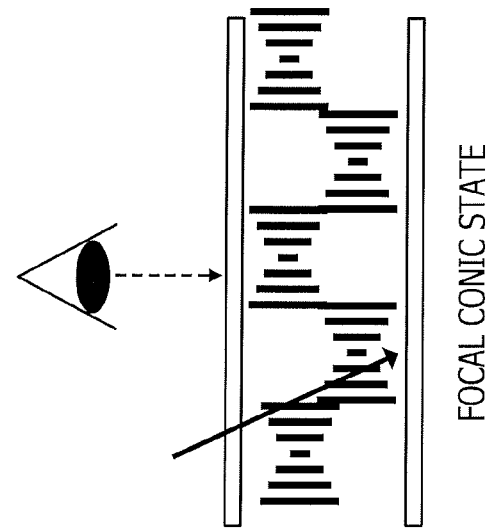
FIGS. 1A, 1B, 1C and 1D illustrate an exemplary state of a cholesteric liquid crystal.
Figure 1B:
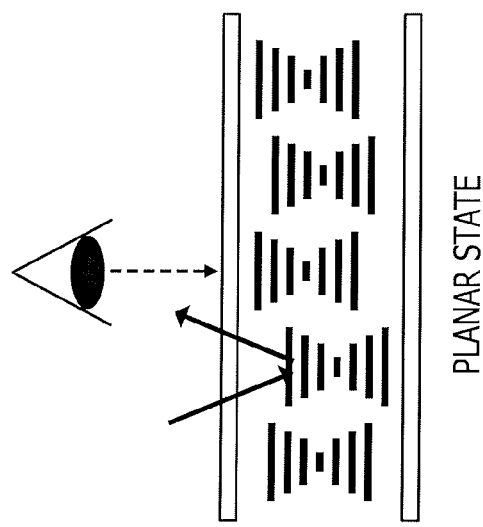

For example, several tens of percent of a chiral additive (such as, a chiral material) is added to a nematic liquid crystal so that a helical cholesteric phase is formed in a molecule of the nematic liquid crystal and cholesteric liquid crystal is generated. The data display is controlled based on the orientation of each of the cholesteric liquid crystal molecules in the cholesteric liquid crystal. Each of FIGS. 1A, 1B, 1C, and 1D illustrates an exemplary state of a cholesteric liquid crystal. FIG. 1A illustrates a planar state where incident light is reflected by the cholesteric liquid crystal. FIG. 1B illustrates a focal conic state where incident light passes through the cholesteric liquid crystal.

In the planar state, as illustrated in FIG. 1A, light with the waveform corresponding to the helical pitch of the liquid crystal molecule is reflected. The helical pitch may be the length of a single rotation performed by a liquid crystal molecule in the planar state. A waveform λ, observed when the reflection is maximized, may be illustrated by the following equation, where the average refractive index of the liquid crystal is n and the helical pitch is p:

$$\lambda = n \cdot p.$$

A light absorption layer is provided aside from a liquid crystal layer. When the cholesteric liquid crystal is in the focal conic state illustrated in FIG. 1B, a black color is displayed.

Figure 1C:
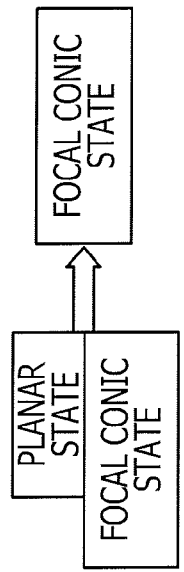
Figure 1D:
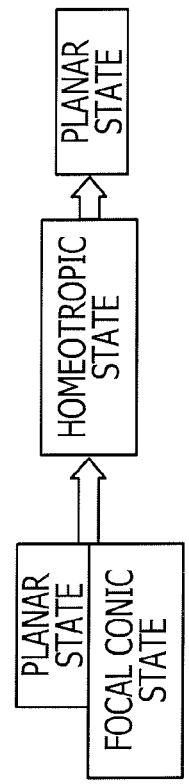
Figure 10:
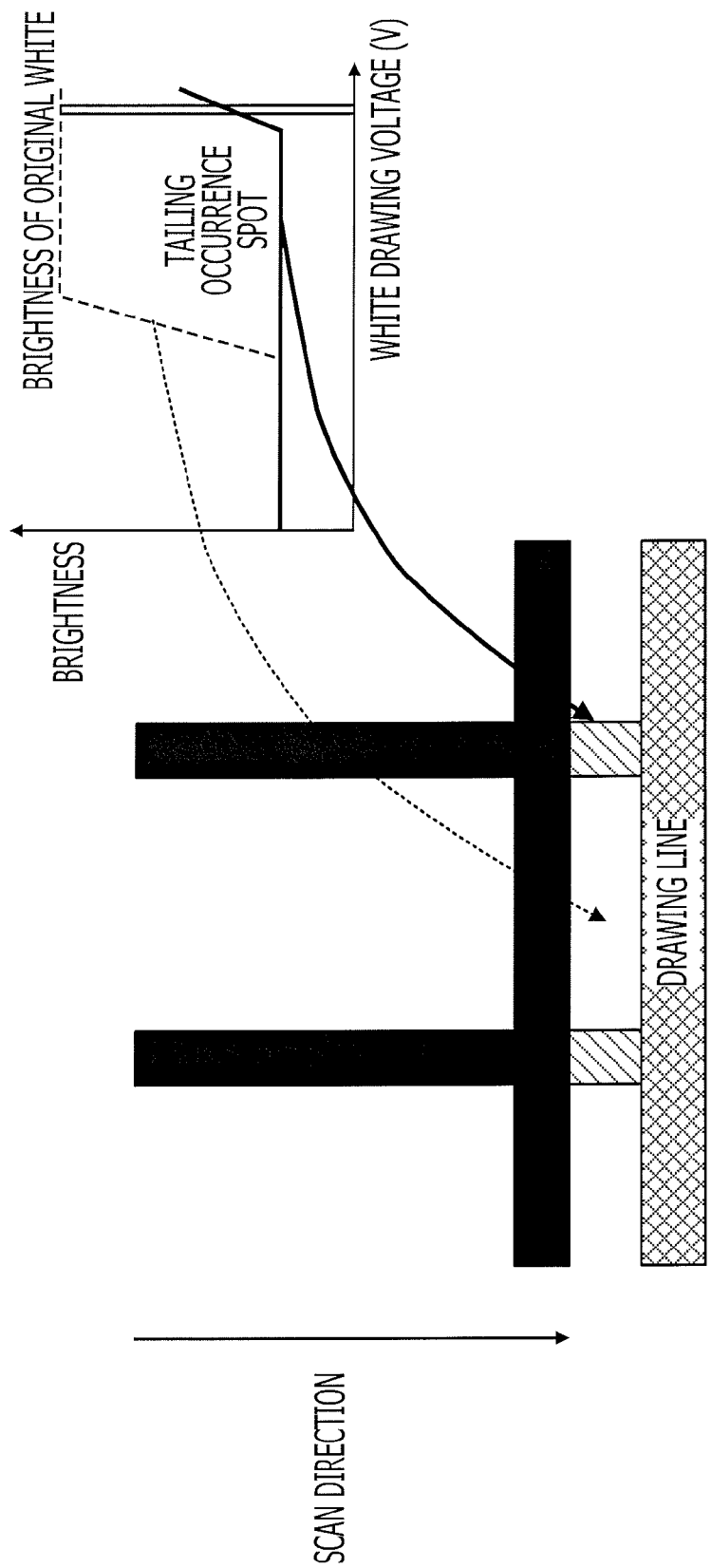
FIG. 10 illustrates an exemplary tailing.

Each of FIGS. 1C and 1D illustrates exemplary changes in the state of the cholesteric liquid crystal. For example, when a strong electric field is applied to the liquid crystal in the planar state or the focal conic state, as illustrated in FIG. 10, the helical structure of the liquid crystal molecule is dissolved and the liquid crystal enters the homeotropic state where the liquid crystal molecule is oriented in the direction of the electric field. When the cholesteric liquid crystal is set to the electric field zero in the homeotropic state, the helical axis of the liquid crystal becomes perpendicular to an electrode so that the liquid crystal enters the planar state where the light corresponding to the helical pitch is selectively reflected.

When an electric field, which is weak enough that the helical structure of the liquid crystal molecule is not dissolved, is formed, then eliminated or when a strong electric field is formed, and then slowly eliminated, the helical axis of the liquid crystal becomes parallel to the electrode and the liquid crystal enters the focal conic state where incident light passes through the liquid crystal, as illustrated in FIG. 1D. When an intermediate electric field is formed and is then abruptly eliminated, the planar state and the focal conic state coexist and mid-tone image data is displayed.

FIG. 2 illustrates exemplary patterns. The sign "a" illustrated in FIG. 2 illustrates an exemplary tailing. For example, when black letters "FJ" are displayed on a white background, the region under the vertical line of the letter "F" or the letter "J" is displayed in white. When the tailing occurs, however, the region may be displayed as a gray smear.

The sign "b" illustrated in FIG. 2 illustrates exemplary bright black display. Although part of the letters "FJ" is displayed in black, the part may be displayed in an insufficient shade of black when the bright black display occurs.

Figure 3:
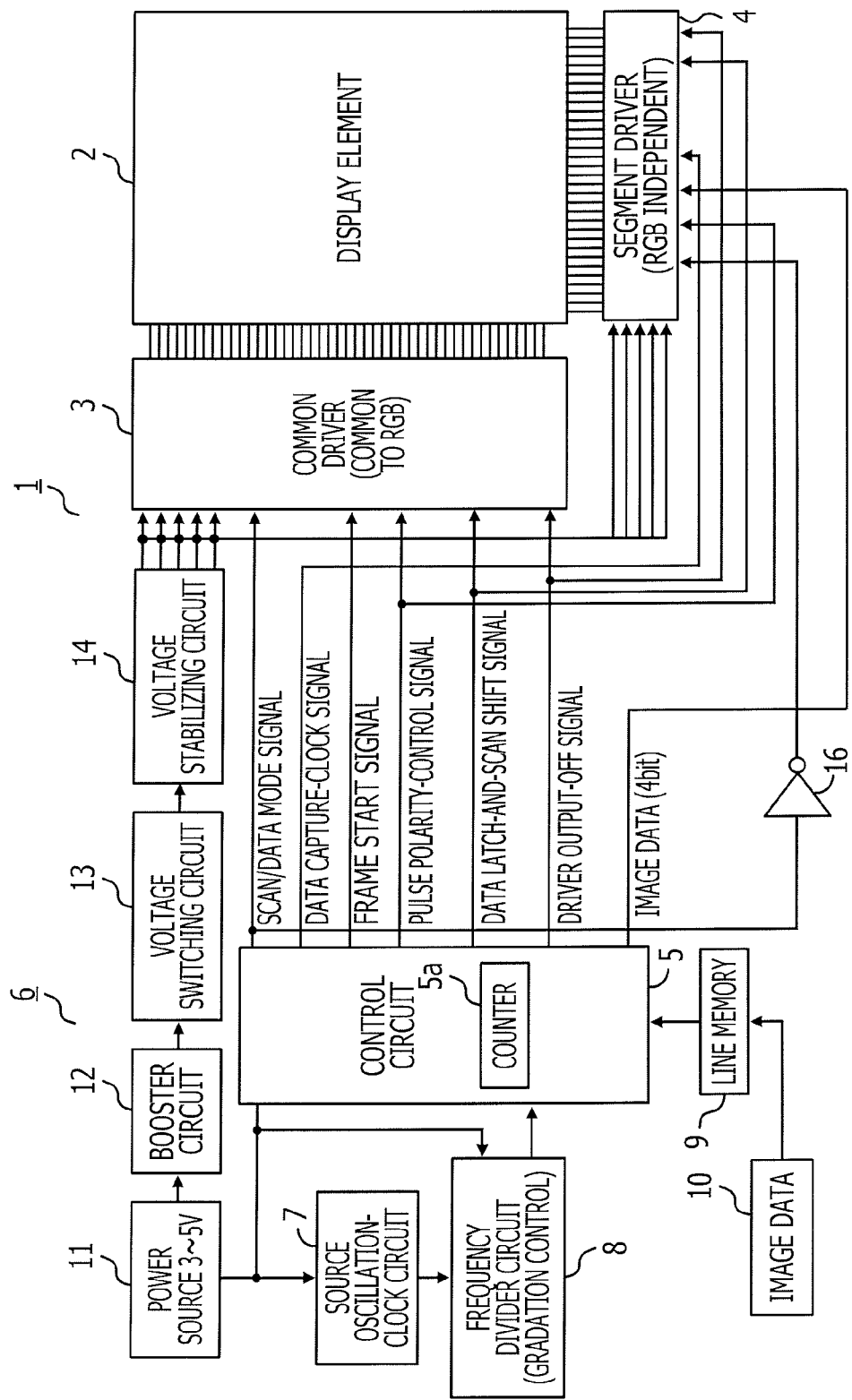
FIG. 3 illustrates an exemplary reflection-type display apparatus.

FIG. 3 illustrates an exemplary reflection-type display apparatus. The reflection-type display apparatus 1 includes a display element 2, a common driver 3 and a segment driver 4 that dynamically drive the display element 2, a control circuit 5 for supplying various control signals to each of the common driver 3 and the segment driver 4, a power circuit 6 for supplying power to each of the common driver 3 and the segment driver 4, a source oscillation-clock circuit 7, and a frequency divider circuit 8. Image data 10 may be supplied to the control circuit 5 via a line memory 9; and a counter 5a included in the control circuit 5 may count the image data 10.

The power circuit 6 includes a power source 11, a booster circuit 12, a voltage switching circuit 13, and a voltage stabilizing circuit 14. A voltage of 3 to 5 volts, which is supplied to the power source 11, is boosted to a voltage of 36 to 40 volts by the booster circuit 12. The booster circuit 12 includes a booster regulator such as, a DC-DC converter. The voltage switching circuit 13 may change a mid-tone voltage and may apply a driving voltage to each of the common driver 3 and the segment driver 4 via the voltage stabilizing circuit 14 including an operational amplifier or the like.

The power supply 11 supplies power to the source oscillation-clock circuit 7; and the source oscillation-clock circuit 7 supplies a reference clock signal to the frequency divider circuit 8. The frequency divider circuit 8 performs the frequency division on the reference clock signal supplied from the source oscillation-clock circuit 7 and supplies the signal to the control circuit 5. The divided clock signal may be used for the gradation control.

The control circuit 5 generates a signal supplied to each of the common driver 3 and the segment driver 4. The signal may include, for example, a scan/data mode signal, a data capture-clock signal, a frame start signal, a pulse polarity-control signal, a data latch-and-scan shift signal, or a driver output-off signal. Image data supplied to the control circuit 5 may be supplied to the segment driver 4 at a certain timing.

The frame start signal is supplied to the common driver 3. The frame start signal instructs the display element 2 including 1024×768 pixels to start the data display. The common driver 3 or the segment driver 4 is selected based on the scan/data mode signal. The scan/data mode signal is supplied to the common driver 3, and is supplied to the segment driver 4 via an inverter 16.

The data capture-clock signal is supplied to the segment driver 4. The image data is supplied from the control circuit 5 to the segment driver 4 every four bits, for example, in synchronization with the data capture-clock signal. The image data is serially supplied to the segment driver 4 and is latched into a latch circuit (not shown) included in the segment driver 4 in synchronization with an output of the data latch-and-scan shift signal.

The polarity of a voltage supplied from each of the common driver 3 and the segment driver 4 to the display element 2 is changed based on the pulse polarity-control signal. After the image data is written into the display element 2, the power supplied to each of the common driver 3 and the segment driver 4 is stopped based on the driver output-off signal.

Figure 4:
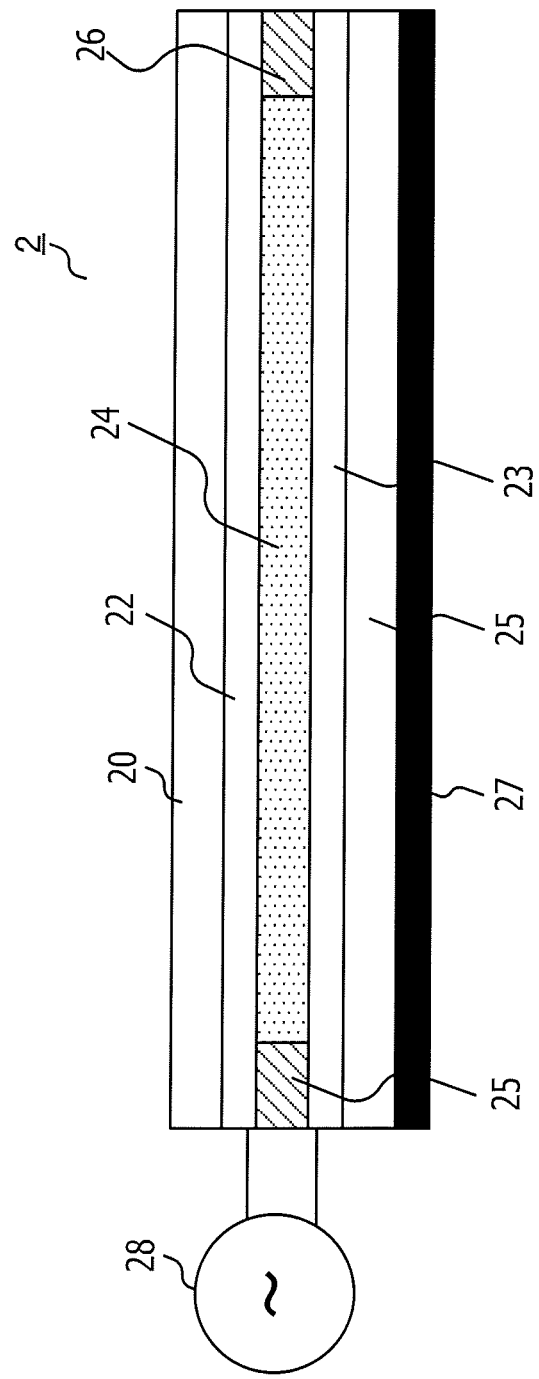
FIG. 4 illustrates an exemplary cross-section of a display element.

FIG. 4 illustrates an exemplary cross-section of a display element. The display element illustrated in FIG. 4 may be the display element 2 illustrated in FIG. 3. The display element 2 includes translucent film substrates 20 and 21, indium-tin oxide (ITO) electrodes 22 and 23, a liquid crystal mixture 24, sealing compounds 25 and 26 that seal the liquid crystal mixture 24, and an absorbing layer 27. A driving circuit 28 is coupled to each of the ITO electrodes 22 and 23, and a pulse-like driving signal such as, a driving voltage is applied from the driving circuit 28 to each of the ITO electrodes 22 and 23.

The ITO electrodes 22 and 23 are opposed to each other so that the ITO electrodes 22 and 23 cross each other when being viewed from an orientation perpendicular to the film substrates 20 and 21. The absorbing layer 27, which absorbs visible light, is provided on the back face of the film substrate 21, which is positioned opposite to the light incident side.

Each of the film substrates 20 and 21 includes a film substrate including polyethylene terephthalate (PET), polycarbonate (PC), etc. A glass substrate may be used for each of the film substrates 20 and 21. Although each of the ITO electrodes 22 and 23 includes, for example, indium tin oxide (ITO), each of the ITO electrodes 22 and 23 may include a transparent conductive film including, for example, indium zinc oxide (IZO).

The liquid crystal compound 24 includes a cholesteric liquid crystal composition showing a cholesteric phase at room temperature.

FIGS. 5A, 5B, and 5C illustrate exemplary response characteristics of a cholesteric liquid crystal. In each of FIGS. 5A, 5B, and 5C, the relationship between an applied voltage and reflectivity is illustrated as the response characteristics. As illustrated in FIG. 5A, when a pulse voltage with a pulse width of, for example, several tens of milliseconds, is increased to a certain range, the cholesteric liquid crystal in the planar state enters a drive band in the focal conic state. When the pulse voltage is further increased, the cholesteric liquid crystal enters the planar state again. When the initial state of the cholesteric liquid crystal is the focal conic state, the state is changed into the planar state with an increase in the pulse voltage. A voltage used to set the initial state to the planar state may be a voltage of, for example, ±38 volts.

When a low voltage or a pulse voltage with a short period is applied to the cholesteric liquid crystal, as illustrated in FIGS. 5B and 5C, the response characteristics of the cholesteric liquid crystal may be shifted to the high voltage side. For example, when an on-voltage and an off-voltage are voltages of ±24 volts and voltages of ±14 volts respectively, driving voltages with periods of 2 milliseconds and 1 millisecond are applied to the cholesteric liquid crystal, and the initial state of the cholesteric liquid crystal is the planar state, the response characteristics are not shown when the voltage of ±14 volts is used and the period is one of 2 milliseconds as illustrated in FIGS. 5B and 1 millisecond as illustrated in FIG. 5C so that the planar state is maintained. When the voltage of ±24 volts is used, the response characteristics are shown for the periods of 2 milliseconds and 1 millisecond, and a mid-tone image data with decreased reflectivity is displayed. The decrease in the reflectivity may be more significant for the period of 2 milliseconds than for that of 1 millisecond. The period of 2 milliseconds corresponds to a low gradation.

FIG. 6 illustrates an exemplary voltage of a driving waveform. The voltage illustrated in FIG. 6 may be the voltage illustrated in FIG. 5A. The sign "ON-SEG" illustrates an on-driving voltage of the segment driver 4. The first half of the on-driving voltage may be 38 volts; and the latter half of the on-driving voltage may be 0 volt. The sign "OFF-SEG" illustrates an off-driving voltage of the segment driver 4. The first half of the off-driving voltage may be 26 volts; and the latter half of the off-driving voltage may be 12 volts. The sign "ON-COM" illustrates an on-driving voltage of the common driver 3. The first half of the on-driving voltage may be 0 volt; and the latter half of the on-driving voltage may be 38 volts. The sign "OFF-COM" illustrates an off-driving voltage of the common driver 3. The first half of the off-driving voltage may be 32 volts; and the latter half of the off-driving voltage may be 6 volts.

A pixel to which a set voltage is applied is provided at a position where the common driver 3 and the segment driver 4 cross each other; and a difference voltage, which is supplied to each of the common driver 3 and the segment driver 4, is applied to the pixel. For example, as illustrated in FIG. 6, the first half voltage of 38 volts and the latter half voltage of −38 volts may be applied to an on-driven pixel of a selected line, for example, a white pixel. The first half voltage of 26 volts and the latter half voltage of −26 volts may be applied to an off-driven pixel of the selected line, for example, a black pixel. The first half voltage of 6 volts and the latter half voltage of −6 volts may be applied to an on-driven pixel of an unselected line. The first half voltage of −6 volts and the latter half voltage of 6 volts may be applied to an off-driven pixel of the unselected line; and the previous display state may be maintained.

FIG. 7 illustrates an exemplary mid-tone image voltage. The voltages ON-SEG, OFF-SEG, ON-COM, and OFF-COM, which are illustrated in FIG. 7, may be similar to or substantially the same as those illustrated in FIG. 6. A difference voltage supplied to each of the common driver 3 and the segment driver 4 may be applied to a pixel to which a set voltage is applied.

The switching of the supply voltage illustrated in FIGS. 6 and 7 may be performed by a voltage switching circuit 13 illustrated in FIG. 3.

Figure 8:
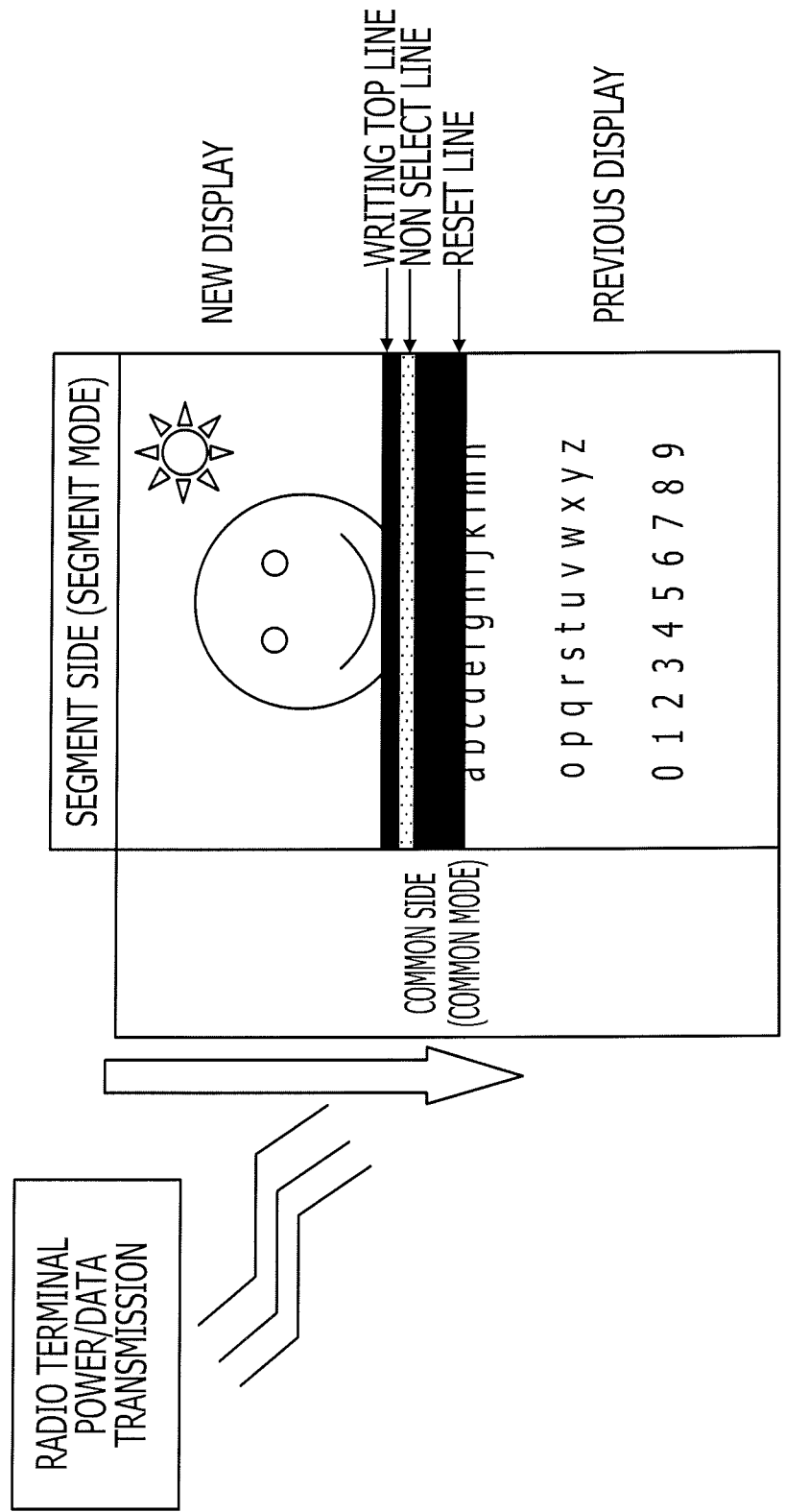
FIG. 8 illustrates an exemplary drive process.

FIG. 8 illustrates an exemplary drive process. In FIG. 8, a driving voltage is applied to the display element 2 so that image data is displayed on the display element 2. For example, twenty reset lines are provided and the writing of a single line is repeated as many times as the line number so that screen image data is updated. The lower half of the screen image data may illustrate previously displayed image data, and the upper half of the screen image data may be newly displayed image data. In FIG. 8, the data writing is started from the topmost line; and a writing line, for example, a writing top line reaches the part near the center of the screen image. A non select line may be a single line.

Figure 9:
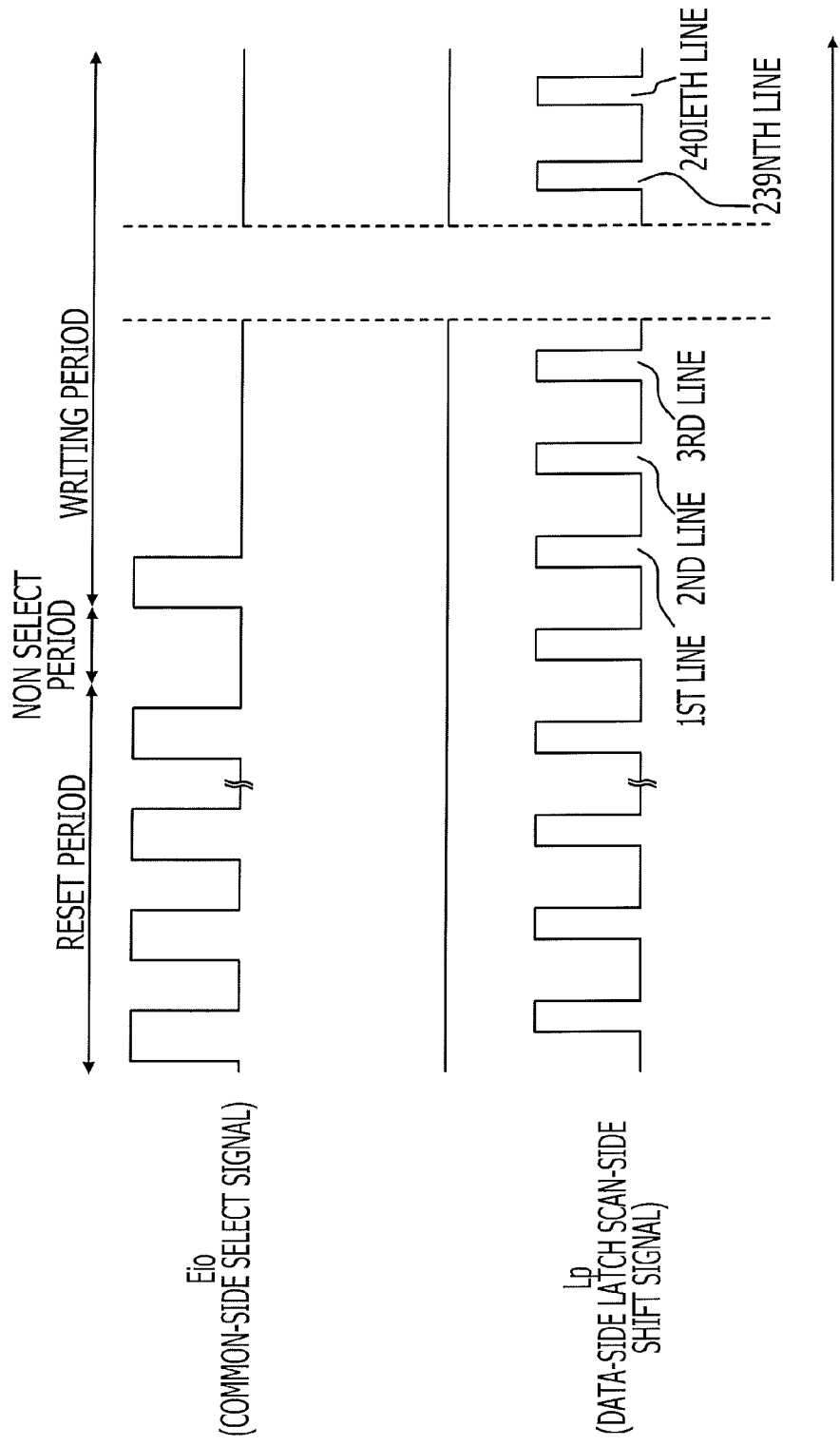
FIG. 9 illustrates an exemplary drive process.

FIG. 9 illustrates a different exemplary drive process. The drive process may be the drive process illustrated in FIG. 8. For example, when the first line illustrated in FIG. 9 corresponds to the writing top line illustrated in FIG. 8 and the first line (the writing top line) is driven, the voltage is applied to the first line (the writing top line) twenty times in a reset period, and a driving voltage is applied to the writing top line via a stop period. After pre-driving is performed twenty times on a line selected based on a select signal such as, an Eio signal and a shift signal such as, an Lp signal in the reset period, whereby image data is written on the top line.

When the second line is driven, the pre-driving is performed twenty times in the reset period and the image data is written after the stop period. When each of the third line, the fourth line, and so forth is driven, the pre-driving is performed in the reset period and the image data is written via the stop period.

FIG. 10 illustrates an exemplary tailing. Since the voltage response characteristics of a pixel observed after the white dot image data is displayed are different from those of a pixel observed after the black dot image data is continuously displayed, the tailing may occur. The pixel observed after the black dot image data is continuously displayed had not entered the homeotropic state where the white drawing is performed. Therefore, the voltage response characteristics illustrated in FIG. 5 may be shifted to the high voltage side so that the brightness of white is not achieved even though a white drawing voltage is applied to the display element 2 during the rewriting period.

When the black dot image data is not continuously displayed and the black dot image data is interrupted by the display of the white dot image data, a drawing voltage for the white dot image data, for example, a voltage for transition to the homeotropic state is applied to the display element 2. Therefore, the voltage response characteristics may not be shifted to the high voltage side and the white-color image data is displayed.

The bright black display is a phenomenon which is the opposite of the tailing. The bright black display may occur at a pixel observed after the white dot image data is continuously displayed. When the white dot image data is continuously displayed, the homeotropic state is maintained until the rewriting period starts. Therefore, even though a drawing voltage for the black dot image data (for example, a voltage for transition to the focal conic state) is applied to the display element 2 when drawing the final pixel, the black-color image data may not be displayed.

When the black dot image data is subsequently displayed and the drawing voltage for the black dot image data is applied to the display element 2 when drawing the final data, the cholesteric liquid crystal may enter the focal conic state with a sufficient degree of saturation and the black image data may be displayed at high density.

The tailing may occur when white image data is displayed after the black dot image data is continuously displayed. The bright black display may occur when the black-color image data is displayed after the white-color dot image data is continuously displayed. When a line where the tailing and/or the bright black display occurs is predicted, extracted, and driven, the white-color image data and/or black-color image data may be displayed by changing the scan speed.

Figure 11:
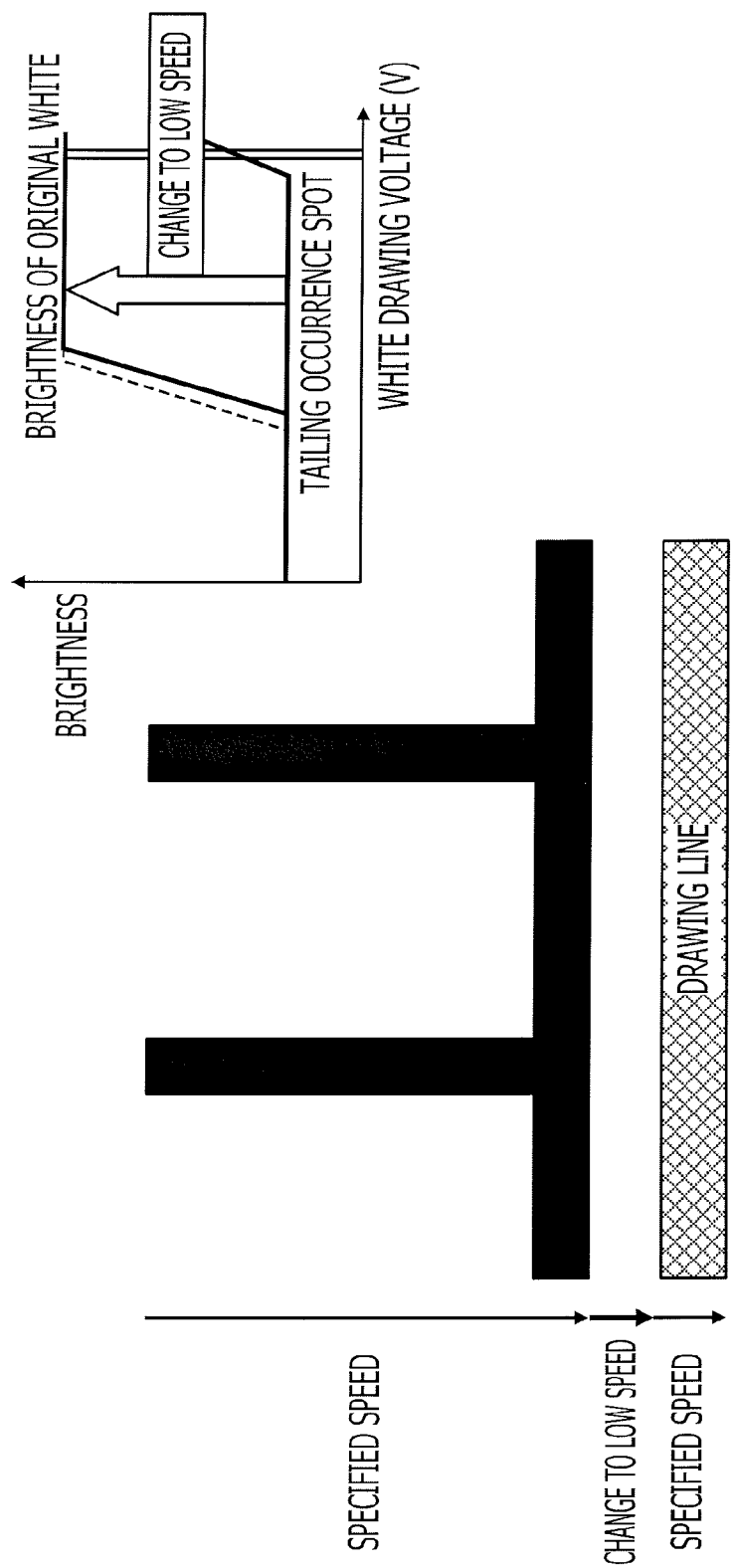
FIG. 11 illustrates an exemplary prediction process.

FIG. 11 illustrates an exemplary prediction process. When the line where the tailing or the bright black display occurs is predicted and driven, the scan speed is changed to a low speed. The tailing and the bright black display may be reduced.

The scan speed may be set to a speed of, for example, 7 milliseconds per line. The speed of scanning the line where the occurrence of the tailing or the bright black display is predicted may be set to a speed of, for example, 10 milliseconds per line.

Figure 12:
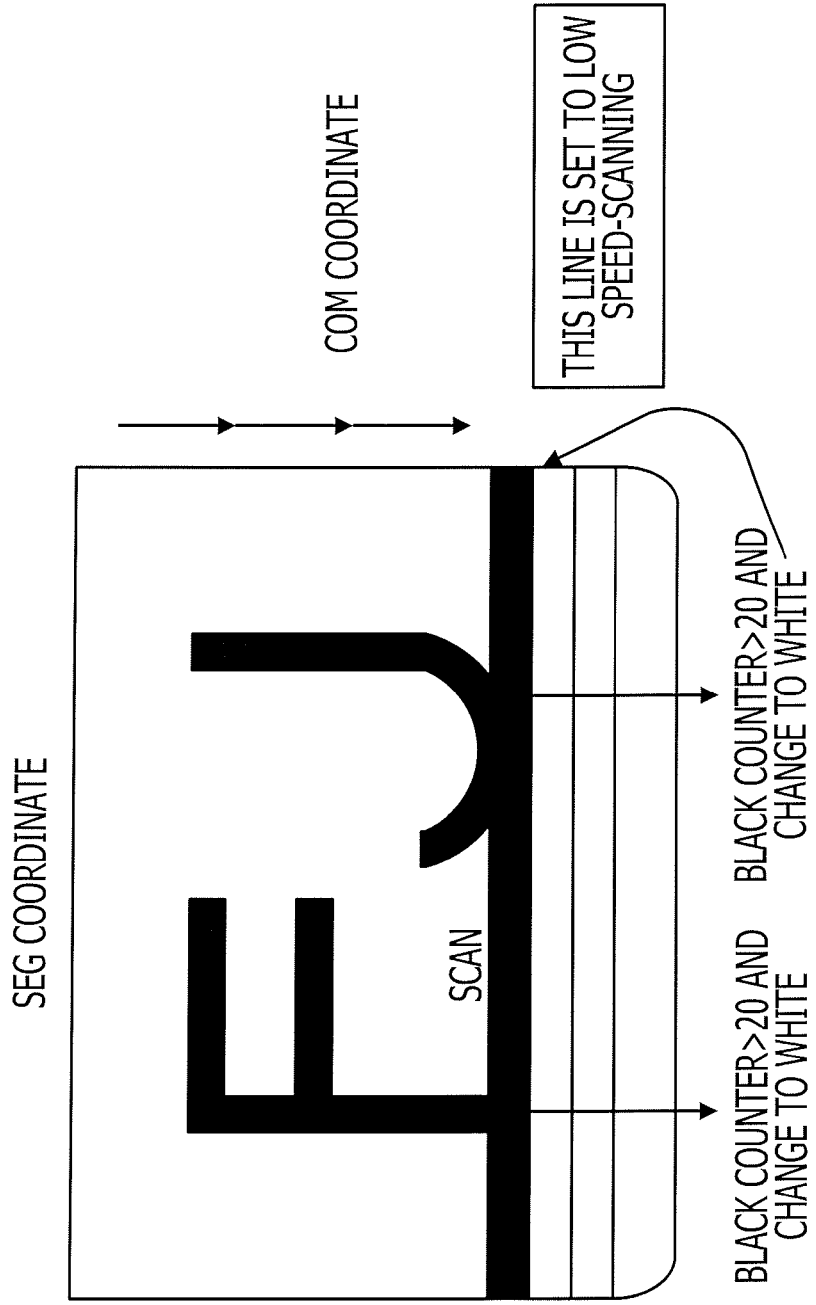
FIG. 12 illustrates an exemplary drive process.

FIG. 12 illustrates an exemplary drive process. The tailing may occur when the white-color image data is displayed after the image data of at least twenty black dots is continuously displayed. The bright black display may occur when the black-color image data is displayed after the image data of at least twenty white dots is continuously displayed.

The control circuit 5 includes a counter 5a. The counter 5a counts a number of consecutive black dots and a number of consecutive white dots for all of the vertical lines of the image data. A threshold value (such as, twenty dots) may be set to the counter 5a. For example, when the image data of black dots of which number is equal to or larger than the threshold value appears and then the white dot image data appears, it is predicted that the tailing occurs on several lines coming after the appearance of the white dot image data. Consequently, the several lines may be scanned at a low speed.

For example, when the image data of white dots the number of which is equal to or larger than the threshold value appears and then the black dot image data appears, it is predicted that the bright black display occurs on several lines coming after the appearance of the black dot image data. Consequently, the several lines may be scanned at a low speed.

The low speed scanning is performed, for example, based on a flag setting. For example, a line to which flag data is set is scanned at a low speed. When the image data is changed from the white dot image data to the black dot image data and vice versa before the number of the consecutively displayed white dots or black dots reaches the threshold value (for example, twenty), the count value of the counter 5a is reset and is counted again.

In FIG. 12, the image data of black dots the number of which is equal to or larger than the threshold value appears, and the white dot image data then appears. For example, when the first line of the common driver 3 includes the black dot image data, the coordinate counter value of the segment driver 4 is incremented by, for example, +1.

When the second line of the common driver 3 includes the black dot image data, the coordinate counter value of the segment driver 4 is incremented by, for example, +1. When the black dot image data is displayed on the twentieth line of the common driver 3, the coordinate counter value of the segment driver 4 is incremented by, for example, +1. The above-described process is repeatedly performed.

When the counter value reaches twenty and the next pixel turns white, a line including the above-described pixel is scanned at a low speed. For example, a voltage is applied to the line in a sufficient period of time and bright white image data may be displayed. The above-described process is repeatedly performed, whereby the tailing may be reduced.

When the bright black display occurs, the coordinate counter value of the segment driver 4 corresponding to the white dot image data is sequentially incremented by, for example, +1 from the first line of the common driver 3. When the counter value reaches twenty and the next image data is changed into the black dot image data, a line including the above-described pixel is scanned at a low speed, whereby the bright black display may be reduced.

Figure 13:
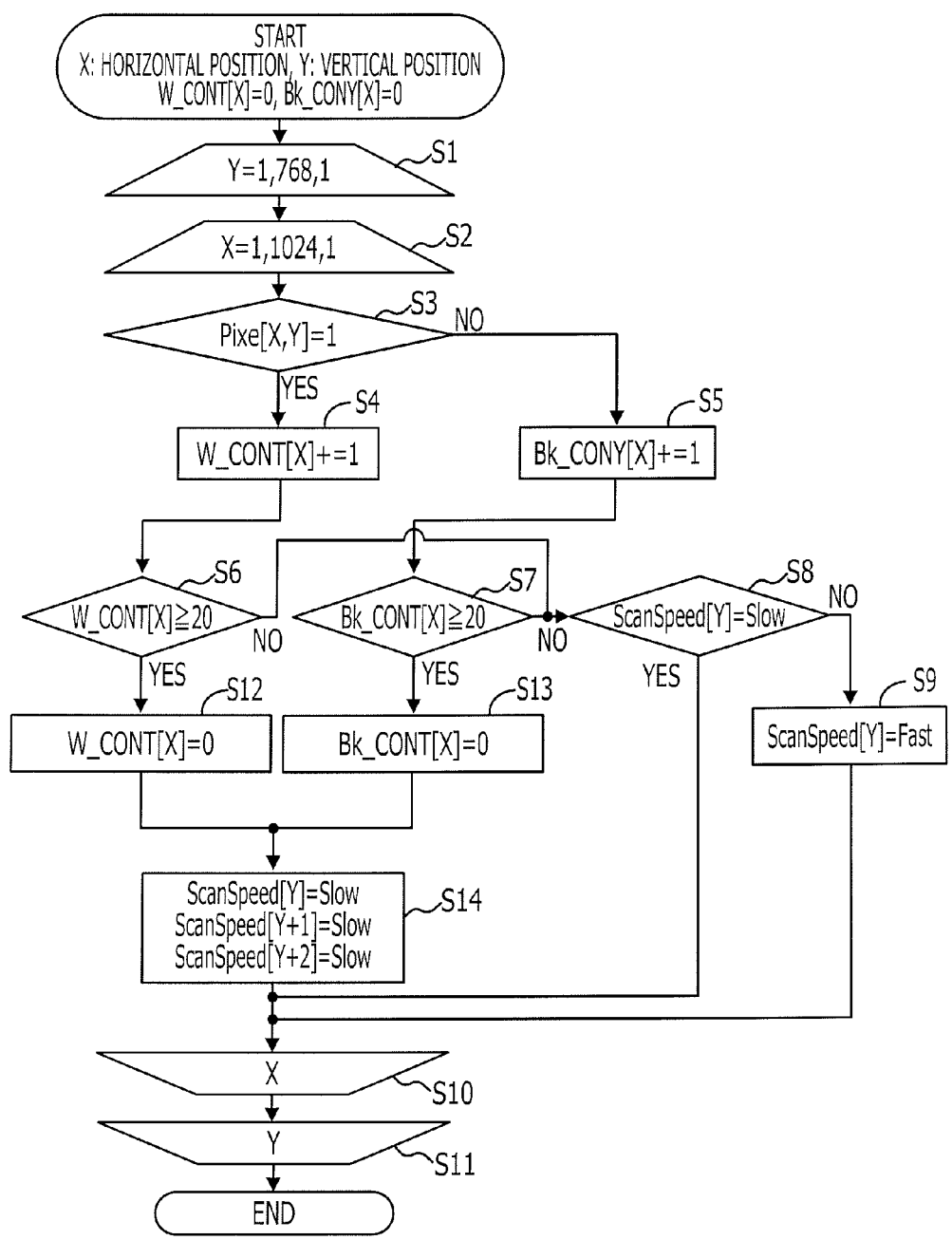
FIG. 13 illustrates an exemplary drive process.

FIG. 13 illustrates an exemplary drive process. The sign "W_CONT" illustrates a white dot counter. The sign "Bk_CONT" illustrates a black dot counter. The sign "Pixel" illustrates the pixel value. The numeral "1" illustrates white and the numeral "0" illustrates black. The sign "XGA" may illustrate pixels provided in the display element 2, for example, 1024×768 pixels. The sign "ScanSpeed[Y]" may be a timing when the scan/data mode signal is output and may be set by the control circuit 5. When the image data of black dots the number of which is equal to or larger than the threshold value, for example, twenty appear or the image data of white dots of which number is equal to or larger than the threshold value, the scanning is performed at a low speed, whereby the tailing or the bright black display may be reduced.

The frame start signal is output from the control circuit 5 and image data is displayed on the display element 2. The sign "X" illustrates a horizontal position and the sign "Y" illustrates a vertical position. Initially, "0" may be set to each of W_CONT[X] and Bk_CONT[X].

When the frame start signal is output, "1" is set to each of the vertical position Y and the horizontal position X. The expression Y=1, 768, 1 at operation S1 illustrates that the vertical position Y is changed from 1 dot to 768 dots and "1" is set as the first vertical position Y. The expression X=1, 1024, 1 at operation S2 illustrates that the horizontal position X is changed from 1 dot to 1024 dots and "1" is set as the first horizontal position X.

It is determined whether or not the value of the image data corresponding to Pixel[X, Y] is 1 at operation S3. When the value of the image data corresponding to Pixel[Y, Y] is 1 (at operation S3: YES), "1" is added to the value of the white dot counter W_CONT[X] at operation S4, for example. When the value of the image data corresponding to Pixel[1, 1] is 0 (at operation S3: NO), "1" is added to the value of the black dot counter Bk_CONT[X} at operation S5, for example.

It is determined whether or not the count value of the white dot counter W_CONT[X] reaches "20" at operation S6, for example. It is determined whether or not the count value of the black dot counter Bk_CONT[X] reaches "20" at operation S7. When the count value of neither the white dot counter nor the black dot counter reaches "20", it is determined whether or not the scan speed indicated by the sign ScanSpeed[Y] be reduced to a low speed at operation S8. When the answer is NO at operation S8, the scan speed of the display element 2 is high and the scan/data mode signal may be output from the control circuit 5 at a certain timing at operation S9.

The process proceeds to operation 510. The +1 process performed toward the horizontal direction is repeated at the operation S10. It is determined whether or not the value of the image data corresponding to Pixel[X+1, Y] is 1. When the image data value is 1, the count value of the corresponding counter is incremented by +1. Operations S2 to S5 are performed and each of the count values of the corresponding counters is incremented by +1.

The counter 5a may count the number of pixels provided in the horizontal direction individually. When the process performed on the first line defined along the vertical direction is completed, the count value of white dots or black dots at the first line may be set to the counter 5a.

The process proceeds to operation S11. The +1 process is performed in the vertical direction and the above-described process may be performed again. The process corresponding to operation S10 in the horizontal direction is performed on the second line; and when the image data value is 1, the count value of the corresponding counter is incremented by +1.

At each of operation S10 and S11, the process is repeated on each of the third line, the fourth line, and so forth, and the value of the corresponding white dot counter or black dot counter is incremented by +1 at operations S4 and S5. For example, when the count value of the white dot counter reaches "20" (at operation S6: YES), the count value of the white dot counter is reset to "0" at operation S12, for example; and the scan speed is reduced at operation S14.

When the count value of the black dot counter reaches "20" (at operation S7: YES), the count value of the black dot counter is reset to "0" at operation S13; and the scan speed is reduced at operation S14.

When the image data of black dots or white dots the number of which is equal to or larger than the threshold value of the counter, for example, twenty appears continuously, the timing when the scan/data mode signal ScanSpeed[Y] is output is delayed, whereby the tailing or the bright black display may be reduced.

The subsequent two lines are scanned at low speeds; and the historical data before ScanSpeed[Y+1] and ScanSpeed[Y+2] is cancelled, whereby the tailing or the bright black display may be reduced.

When the count value of the white dot counter or the black dot counter does not reach "20", the scan speed may be set to a low speed at operation S8. For example, before the count value reaches the threshold value after the count value is reset, the scan speed for a plurality of lines may be set to a low speed.

For example, when the scan speed is seven milliseconds per line, the scan speed for a line where the tailing and/or the bright black display may occur may be set to a speed of ten milliseconds per line. An arbitrary scan speed may be set based on the threshold value or the like. For example, a speed of forty milliseconds per line or a speed of fifty milliseconds per line may be set to the scan speed.

A spacer may be provided to evenly maintain the inter-substrate gap. The spacer includes a spherical body made from a resin or an inorganic oxide. The spacer may be a fixing spacer, a surface of which is coated with a thermoplastic resin.

The gap provided through the spacer may fall within the range of from 4 to 6 μm. When the gap is small, the reflectivity is reduced and the displayed data is darkened so that a high threshold value-sharpness may not be maintained. Although the high threshold value-sharpness is maintained when the gap is large, the driving voltage may be increased.

The liquid crystal mixture 24 may include a cholesteric liquid crystal including a nematic liquid crystal mixture to which 10 to 40 weight percent of a chiral material is added. The amount of the added chiral material may be a value when the total amount of a nematic liquid crystal component and the chiral material is 100 weight percent.

The nematic liquid crystal may include a known material. The value of the dielectric constant anisotropy (Δ∈) may fall within the range of from 15 to 25. When the value of the dielectric constant anisotropy is 15 or less, the driving voltage may be increased.

The value of the refractive index anisotropy (Δn) may fall within a range in the order of 0.18 to 0.26. When the value of the refractive index anisotropy is smaller than values falling within the above-described range, the reflectivity attained in the planar state may be reduced. When the value of the refractive index anisotropy is larger than the values falling within the above-described range, scatter reflections in the focal conic state become more significant and viscosity increases, whereby the response speed may be reduced.

Figure 14:
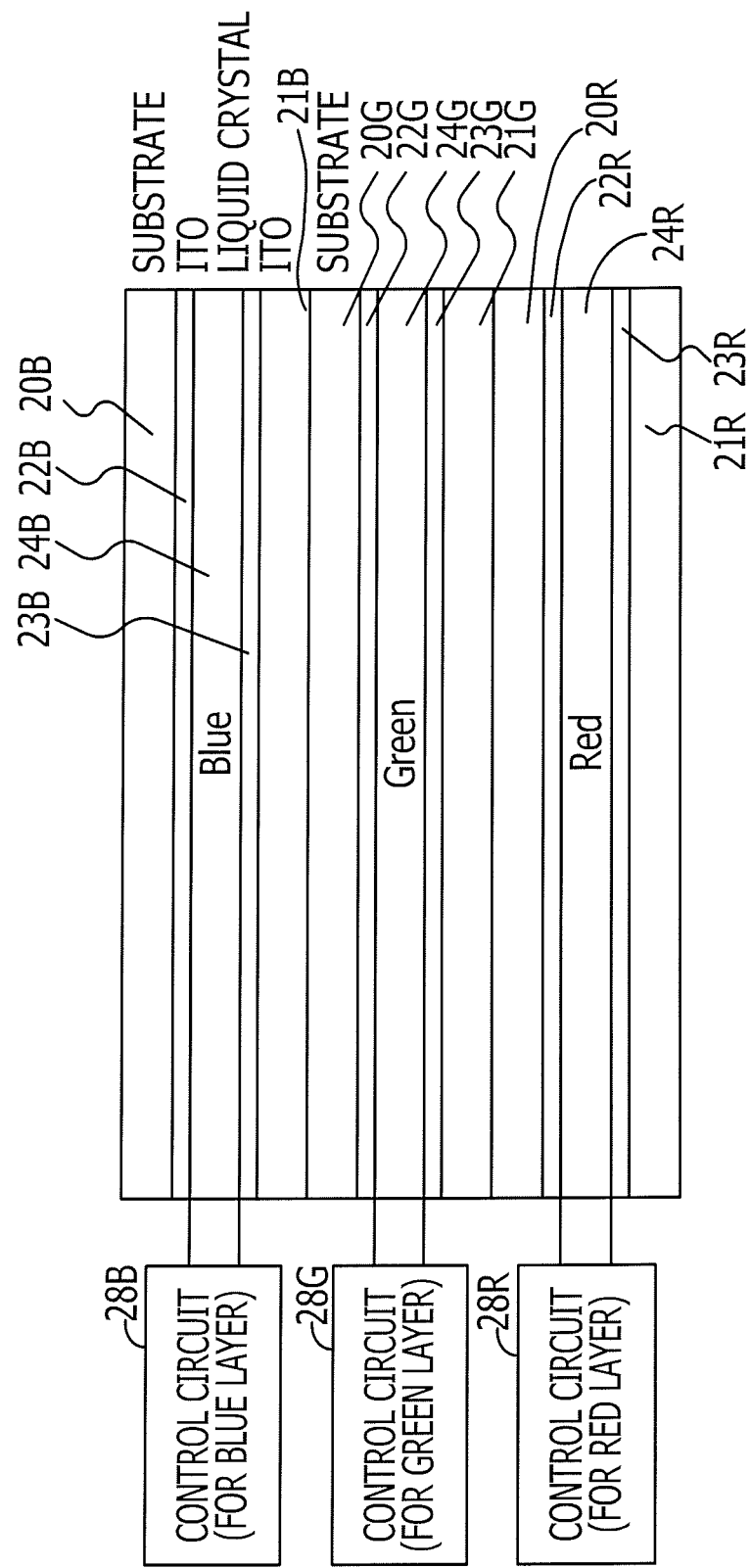
FIG. 14 illustrates an exemplary display panel.

FIG. 14 illustrates an exemplary display panel. FIG. 14 illustrates the display element 2 including a laminated structure including a red (R) display element, a green (G) display element, and a blue (B) display element. Each of the red (R) display element, the green (G) display element and the blue (B) display element includes substrates (such as, translucent film substrates 20 and 21), the ITO electrodes 22 and 23, the liquid crystal mixture 24, and the control circuit 28. The blue display element includes substrates 20B and 21B, ITO electrodes 22B and 23B, a liquid crystal mixture 24B, and a control circuit 28B. The green display element includes substrates 20G and 21G, ITO electrodes 22G and 23G, a liquid crystal mixture 24G, and a control circuit 28G. The red display element includes substrates 20R and 21R, ITO electrodes 22R and 23R, a liquid crystal mixture 24R, and a control circuit 28R.

The display element including the three layers R, G, and B, displays a high-quality color image. For example, when the display element is controlled based on 16 gradations, a display panel for displaying a 4096-gradation color image may be generated.

The input pixel values of the red (R) display element, the blue (B) display element, and the green (G) display element are different from one another. Therefore, the driving control may be performed for each of the red (R) display element, the blue (B) display element, and the green (G) display element respectively. Since the panel structures of the red (R) display element, the blue (B) display element, and the green (G) display element are different from one another, the occurrence of the tailing and/or the bright black display is varied among the red (R) display element, the blue (B) display element, and the green (G) display element. For reducing the rewriting time, the embodiment may not be used for a color which is hardly affected by the tailing and/or the bright black display while the embodiment may be used for a color which is affected significantly by the tailing and/or the bright black display.

Example embodiments of the present invention have now been described in accordance with the above advantages. It will be appreciated that these examples are merely illustrative of the invention. Many variations and modifications will be apparent to those skilled in the art.

The invention claimed is:

1. A reflection-type display apparatus, comprising:
a plurality of scan electrodes and a plurality of signal electrodes that are provided in matrix form;
a setting circuit configured to set at least one of the plurality of scan electrodes as one of a reset line, a writing line and a non select line, the reset line and the writing line being in a selected state, the non select line being in an unselected state;
a supply circuit configured to supply image data to at least one of the plurality of signal electrodes while shifting one of the reset line, the non select line and the writing line;
an extraction circuit configured to extract a writing line corresponding to a pixel which is not changed to a certain display state based on the image data; and
a control circuit configured to set a first scan speed to the extracted writing line, the first scan speed being different from a second scan speed set to an un-extracted writing line.

2. The reflection-type display apparatus according to claim 1, wherein the first scan speed is slower than the second scan speed.

3. The reflection-type display apparatus according to claim 1, wherein the extraction circuit counts a pixel corresponding to first image data provided in a direction parallel to the scan electrode, and extracts a writing line of a second image data when the second image data is detected after the count value exceeds a threshold value.

4. The reflection-type display apparatus according to claim 3, wherein the first image data includes black-color image data and the second image data includes white-color image data.

5. The reflection-type display apparatus according to claim 3, wherein the first image data includes white-color image data and the second image data includes black-color image data.

6. The reflection-type display apparatus according to claim 3, wherein the first scan speed is set to at least one writing line when the first image data or the second image data is consecutive.

7. The reflection-type display apparatus according to claim 1, wherein at least two kinds of voltage are applied to each of the scan electrode and the signal electrode.

8. The reflection-type display apparatus according to claim 1, wherein a cholesteric liquid crystal is charged into space between the scan electrode and the signal electrode.

9. The reflection-type display apparatus according to claim 1, further comprising a laminated structure including a red display element, a green display element, and a blue display element.

10. The reflection-type display apparatus according to claim 9, wherein the extraction circuit and the control circuit are provided in each structure of the laminated structure.

11. A driving method, comprising:
forming a pixel at an intersection of one of a plurality of scan electrodes and one of a plurality of signal electrodes, the plurality of scan electrodes and the plurality of signal electrodes being in matrix form;
setting at least one of the plurality of scan electrodes as one of a reset line, a writing line and a non select line, the reset line and the writing line being in a selected state, the non select line being in an unselected state;
supplying image data to at least one of the plurality of signal electrodes while shifting the reset line, the non select line, and the writing line;

extracting a writing line corresponding to a pixel which is not changed to a certain display state based on the image data; and setting a first scan speed to the extracted writing line, the first scan speed being different from a second scan speed set to an un-extracted writing line.

12. A display panel, comprising:

a plurality of scan electrodes and a plurality of signal electrodes that are provided in matrix form;

a setting circuit configured to set at least one of the plurality of scan electrodes as one of a reset line, a writing line and a non select line, the reset line and the writing line being in a selected state, the non select line being in an unselected state;

a supply circuit configured to supply image data to at least one of the plurality of signal electrodes while shifting one of the reset line, the non select line and the writing line;

an extraction circuit configured to extract a writing line corresponding to a pixel which is not changed to a certain display state based on the image data; and a control circuit configured to set a first scan speed to the extracted writing line, the first scan speed being different from a second scan speed set to an un-extracted writing line.

* * * * *